J. MATTER.
CONCENTRATING APPARATUS.
APPLICATION FILED SEPT. 22, 1909.
976,893.
Patented Nov. 29, 1910.
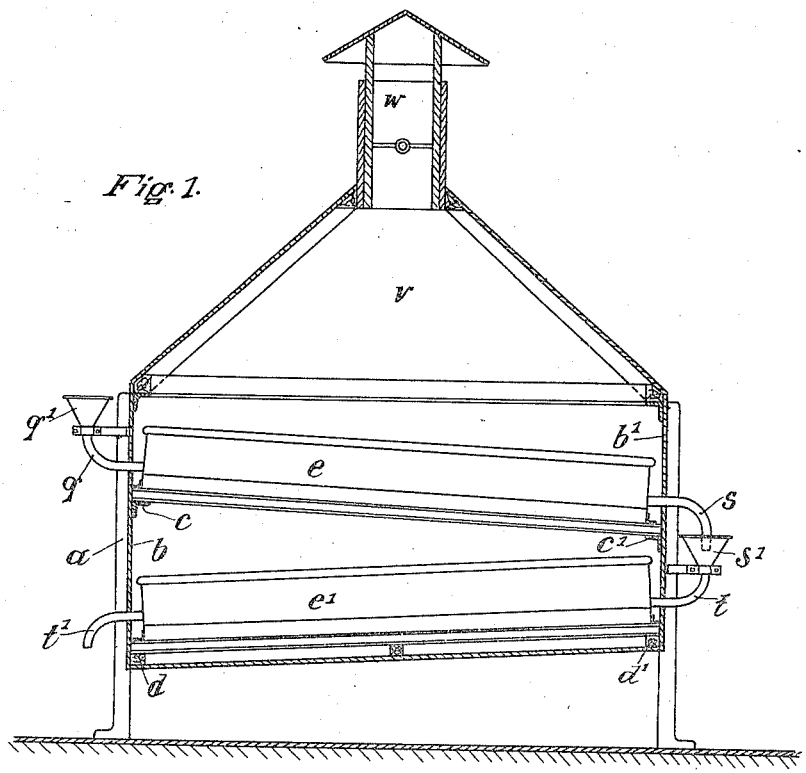
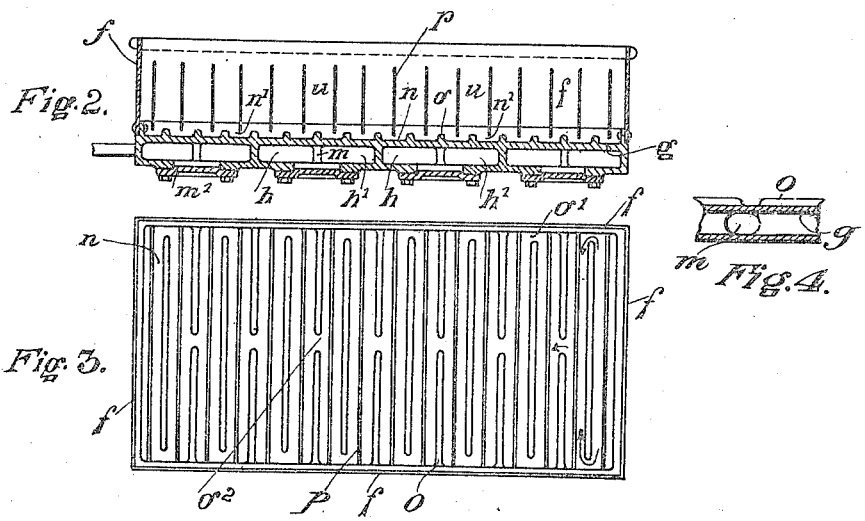
Witnesses:
Inventor:
Julius Matter
by B. Singer
Attorney.

UNITED STATES PATENT OFFICE.

JULIUS MATTER, OF LAAKEN, NEAR BARMEN, GERMANY.

CONCENTRATING APPARATUS.

976,893.  Specification of Letters Patent.  Patented Nov. 29, 1910.

Application filed September 22, 1909.  Serial No. 519,091.

*To all whom it may concern:*

Be it known that I, JULIUS MATTER, of Laaken, near the city of Barmen, Germany, have invented certain new and useful Improvements in Concentrating Apparatus, of which the following is a specification, reference being had therein to the accompanying drawings, forming part of this specification.

Figure 1 is a vertical section of one form of my apparatus, Fig. 2 is a vertical section of the evaporating pan on an enlarged scale, Fig. 3 is a top view of Fig. 2. Fig. 4 is a detailed sectional view.

The object of this invention is to produce an organized apparatus for the concentration or evaporation of lye and other liquids to any desired degree.

I herein describe the apparatus in connection with the concentration of lye used in textile manufacture.

The apparatus comprises a casing $a$ of wood or metal. In said casing are secured on opposite walls $b$, $b'$ the supports $c$ $c'$ and $d$ $d'$ in different height and on said supports are placed the pans $e$, $e'$, each assuming an inclined position, as shown and in such a manner that the upper pan $e$ inclines from left to right and the lower pan $e'$ from right to left and so on.

The particular construction of the pan may be understood from Figs. 2 and 3. Each pan has the upright walls $f$, forming a receptacle of rectangular shape as shown in Fig. 2 and being open at the top. $g$ is the bottom of the pan, which has the compartments $h$, $h'$, that communicate with each other by apertures $m$ and are closed by lids $m'$. The compartments are adapted to receive hot air, steam and the like to heat the inner bottom surface $n$ of the pan. Said surface is fitted with ribs $o$ and these ribs are arranged as shown in Fig. 3 leaving alternately openings $o'$ at the walls $f$ and $o^2$ in their middle portion, so that a liquid may flow over the surface $n$ from one end to the other end in the direction of the arrows. Between the said ribs in the pan are secured vertical walls $p$ made of sheet metal or the like which leave an opening or passage $n'$ over the surface $n$. The pan $e$ is fitted with a pipe $q$, carrying a funnel $q'$, a pipe $s$ extending from the other end of the pan and discharging into a funnel $s'$ of a pipe $t$ which branches from the rear of the pan $e'$. $t'$ is a discharging pipe.

In operation, lye is filled or pumped into the apparatus at $q'$, flowing slowly in a thin sheet or film over the surface $n$ through the upper pan $e$ and then through the pipe connection $s$, $t$ into the lower $e'$ and so on if there are more than two pans. Into the bottom compartments $h$, $h'$ of each pan is fed steam or hot air which thoroughly heats the bottom surface $n$ and their ribs and by the heat thus produced the lye will be readily evaporated and a high degree of concentration may be obtained. The foam which is absorbed from the lye is permitted to pass into the compartments $u$ formed by the vertical walls $p$ and in this way an unhindered concentration can take place. The vapors gathering in the roof $v$ may escape through the chimney $w$.

Having thus described the nature of my invention what I desire to secure by Letters Patent is:

1. An apparatus of the class described comprising in combination, a plurality of evaporating pans arranged for one to deliver to the other and provided with means for causing the liquid to flow in a circuitous or tortuous path, independent means for heating each pan, and a plurality of partitions arranged slightly above said first mentioned means and transversely with respect to the flow of the liquid.

2. An apparatus of the class described comprising in combination, an evaporating housing provided with an outlet, an evaporating pan disposed in said housing and in an inclined position and provided with means for causing the liquid to flow thereover in a circuitous or tortuous path, means for heating the pan, and a plurality of partitions arranged slightly above and between said first mentioned means and forming a plurality of compartments in the pan for permitting the vapor to rise therefrom.

JULIUS MATTER. [L. S.]

Witnesses:
 OTTO KÖNIG,
 E. B. GILLETTE.